United States Patent [19]
Aritomi et al.

[11] Patent Number: 4,621,134
[45] Date of Patent: Nov. 4, 1986

[54] AROMATIC POLYTHIOETHERAMIDE

[75] Inventors: Mitsutoshi Aritomi; Makoto Terauchi, both of Ibaraki, Japan

[73] Assignee: Mitsubishi Petrochemical Co., Ltd., Tokyo, Japan

[21] Appl. No.: 720,688

[22] Filed: Apr. 8, 1985

[30] Foreign Application Priority Data

Apr. 25, 1984 [JP] Japan .................................. 59-83262
Apr. 25, 1984 [JP] Japan .................................. 59-83263

[51] Int. Cl.$^4$ ............................................ C08G 69/42
[52] U.S. Cl. ...................... 528/337; 528/176; 528/179; 528/183; 528/220; 528/222; 528/229; 528/336; 528/338; 528/339; 528/340; 528/348
[58] Field of Search ............... 528/337, 336, 176, 179, 528/183, 220, 222, 229, 338, 339, 340, 348

[56] References Cited

U.S. PATENT DOCUMENTS 3,505,288  4/1970  Bodesheim et al. ................. 528/172
3,738,964  6/1973  Dobinson et al. .................. 528/337
4,410,684 10/1983  Nelb et al. ........................... 528/185

*Primary Examiner*—Harold D. Anderson
*Attorney, Agent, or Firm*—Oblon, Fisher, Spivak, McClelland & Maier

[57] ABSTRACT

Aromatic polythioetheramide polymers having a repeating unit represented by the formulae as shown below and a process for the production thereof are described. These polymers have excellent moldability, flame retardance, heat resistance, and chemical resistance, and are suitable for use as engineering plastics:

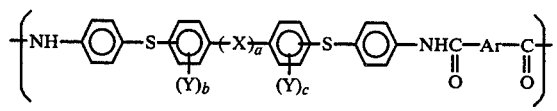

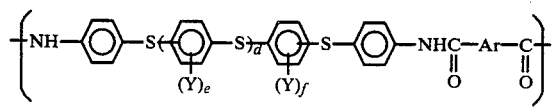

wherein all the symbols are the same as defined in the specification and claims.

4 Claims, 8 Drawing Figures

AROMATIC POLYTHIOETHERAMIDE

FILED OF THE INVENTION

The present invention relates to an aromatic polythioetheramide, i.e., an aromatic polyamide having thioether bond, and a process for producing the same. The aromatic polyamide has excellent heat resistance and moldability and is useful for use as fibers, films, and coating materials.

BACKGROUND OF THE INVENTION

Aromatic polyamides prepared from aromatic diamines and aromatic dicarboxylic acids or chlorides thereof are now under extensive investigation because of their excellent heat resistance and flame retardance. However, aromatic polyamides generally have a high melting points and, in air, many aromatic polyamides have a melting point higher than the thermal decomposition temperature. Thus, it is difficult for the aromatic polyamides to be injection molded or extrusion molded. Moreover, the solubility of aromatic polyamides in the conventional organic solvents is poor and many difficulties are encountered in producing fibers, films, coatings or the like using the aromatic polyamides. Such poor moldability is now improved by lowering the melting point of the aromatic polyamides by using as copolymers or by dissolving them in specific solvents.

Various methods have been proposed to produce aromatic polyamides having improved moldability, which include (a) a method for copolymerizing an aliphatic component (Japanese Pat. application (OPI) Nos. 109592/77 and 94397/78 (the term "OPI" as used herein refers to a "published unexamined Japanese patent application"), (b) a method for introducing connecting functional groups into the main chain, thereby providing flexibility (U.S. Pat. No. 3,505,288, Japanese Pat. application (OPI) Nos. 23198/77 and 104695/78), and (c) a method for random copolymerizing an aromatic component (Japanese Pat. application (OPI) Nos. 104697/78 88427/81, and U.S. Pat. No. 4,410,684). However, polyamides produced by the above methods do not have a sufficient balance between the moldability and the heat resistance.

SUMMARY OF THE INVENTION

An object of the present invention is to provide an aromatic polyamide having thioether bonds therein having balanced moldability and heat resistance.

Another object of the present invention is to provide a process for producing the aromatic polyamide.

The present invention relates to:

(1) an aromatic polythioetheramide polymer having the following repeating unit:

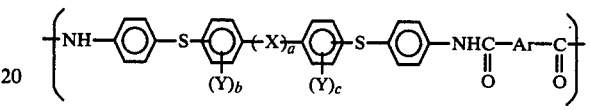

wherein the symbols are as described hereinafter;

(2) a process for producing the aromatic polythioetheramide polymer of (1) above;

(3) an aromatic polythioetheramide polymer having the following repeating unit:

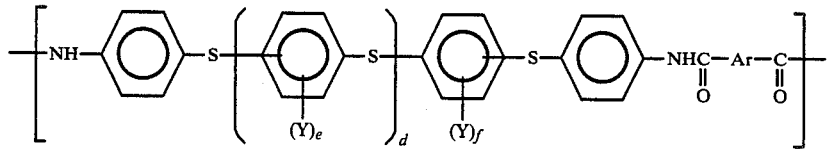

wherein the symbols are as described hereinafter;

(4) a process for producing the aromatic polythioetheramide polymer of (3) above; and (5) an aromatic polyamide copolymer comprising from 51 to 99 mol % of a repeating unit represented by the formula (III), and from 49 to 1 mol % of a repeating unit represented by the formula (IV) and/or a repeating unit represented by the formula (V):

(III)

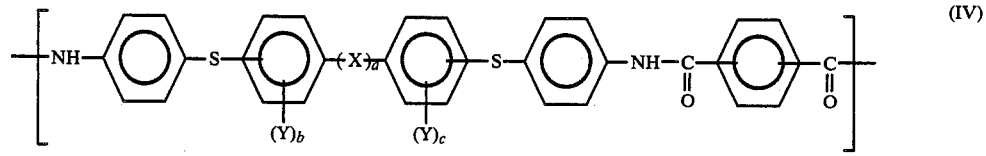

(IV)

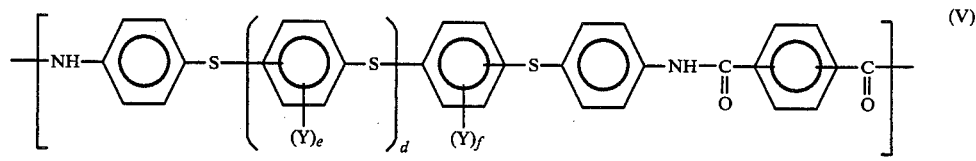

(V)

wherein the symbols are as described hereinafter.

DETAILED DESCRIPTION OF THE INVENTION

Figure 1:
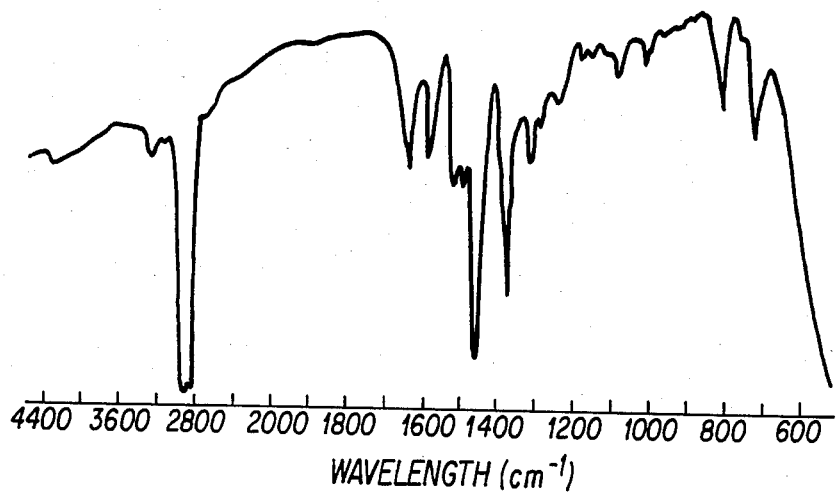
FIGS. 1, 2 and 3 each is an infrared absorption spectrum of the polyamide produced in Examples 2, 4 and 7, respectively.

First invention: The present invention provides an aromatic polythioetheramide polymer having the following repeating unit:

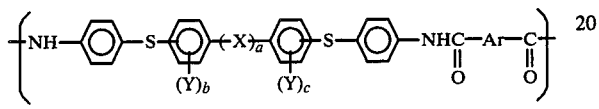

wherein X is a divalent hydrocarbon group having from 1 to 10 carbon atoms, —O—, —S—, —SO—, —SO$_2$—, or —CO—, a is 0 or 1; when a is 0, the aromatic rings are linked directly to each other without X, Y which may be the same or different is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen group, or a nitro group, b and c which may be the same or different each is an integer of from 0 to 4, and Ar is an aromatic ring having from 6 to 30 carbon atoms.

Second invention: The present invention provides a process for producing an aromatic polythioetheramide polymer having the following repeating unit:

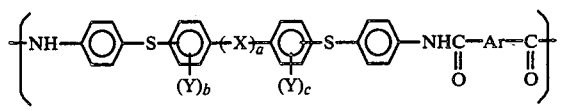

wherein X is a divalent hydrocarbon group having from 1 to 10 carbon atoms, —O—, —S—, —SO—, —SO$_2$—, or —CO—, a is 0 or 1; when a is 0, the aromatic rings are linked directly to each other without X, Y which may be the same or different is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen atom or a nitro group, b and c which may be the same or different each is an integer of 0 to 4, and Ar is an aromatic ring having from 6 to 30 carbon atoms, which comprises reacting a thioether bond-containing aromatic diamine containing at least 50 mol % of a diamine represented by the formula (I):

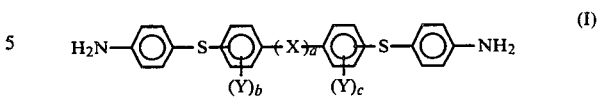

wherein the symbols are the same as defined above, with an aromatic dicarboxylic acid chloride.

Third invention: The present invention provides an aromatic polythioetheramide polymer having the following repeating unit:

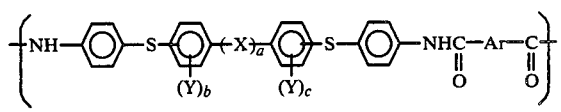

wherein X is a divalent hydrocarbon group having from 1 to 10 carbon atoms, —O—, —S—, —SO—, —SO$_2$—, or —CO—, a is 0 or 1; when a is 0, the aromatic rings are linked directly to each other without X, Y which may be the same or different is an alkyl group having from 1 to 20 carbon atoms, a cycloalkyl group having from 3 to 20 carbon atoms, an aryl group having from 6 to 20 carbon atoms, a halogen group, or a nitro group, b and c which may be the same or different each is an integer of 0 to 4, and Ar is an aromatic ring having from 6 to 30 carbon atoms, which comprises dissolving a thioether bond-containing aromatic diamine represented by the general formula (I):

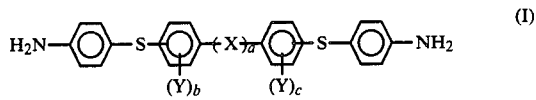

wherein the symbols are the same as defined above, and an aromatic dicarboxylic acid in an organic acid amide or an organic sulfoxide and then polycondensating them in the presence of a condensation agent and a tertiary amine.

Fourth invention: The present invention provides an aromatic polythioetheramide polymer having the following repeating unit:

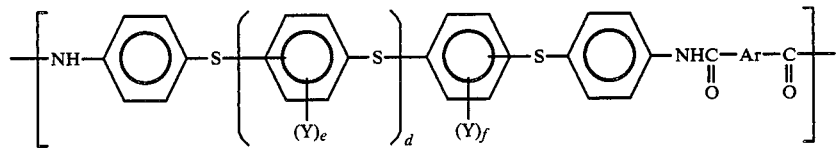

wherein d is an integer of from 0 to 20, Y is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen atom, or a nitro group, e and f which may be the same or different each is an integer of from 0 to 4, and Ar is an aromatic ring having from 6 to 30 carbon atoms.

Fifth invention: The present invention provides a process for producing an aromatic polythioetheramide polymer having the following repeating unit:

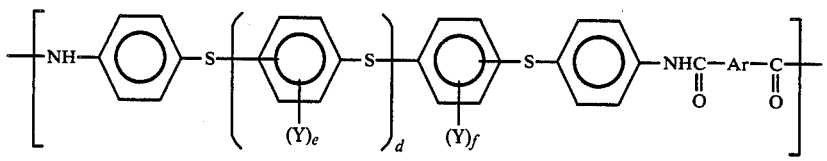

wherein d is an integer of from 0 to 20, Y is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen group, or a nitro group, e and f which may be the same or different each is an integer of from 0 to 4, and Ar is an aromatic ring having from 6 to 30 carbon atoms, which comprises reacting a thioether bond-containing aromatic diamine containing at least 50 mol % of a diamine represented by the formula (II):

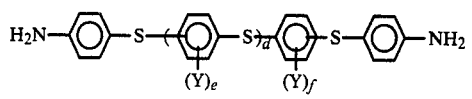
(II)

diamine containing at least 50 mol % of a diamine represented by the formula (II):

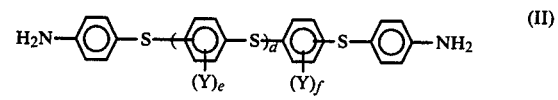
(II)

wherein the symbols are the same as defined above, with an aromatic dicarboxylic acid.

Seventh invention: The present invention provides an aromatic polyamide copolymer comprising from 51 to 99 mol % of a repeating unit represented by the formula (III) shown below, and from 49 to 1 mol % of a repeating unit represented by the formula (IV) and/or a repeating unit represented by the formula (V) shown below.

(III)

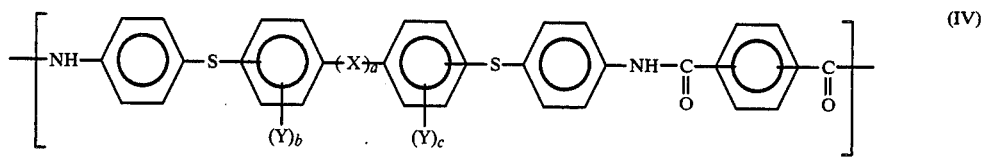
(IV)

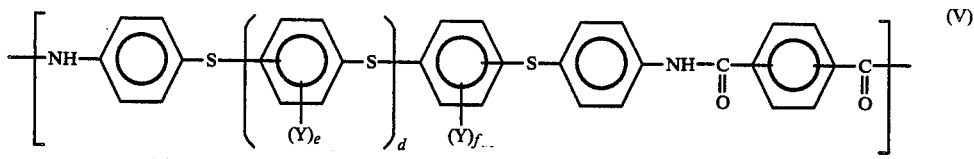
(V)

wherein the symbols are the same as defined above, with an aromatic dicarboxylic acid chloride.

Sixth invention: The present invention provides a process for producing an aromatic polythioetheramide polymer having the following repeating unit:

wherein Ar is an aromatic ring having from 6 to 20 carbon atoms,

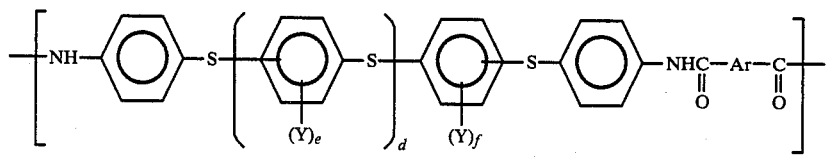

wherein d is an integer of from 0 to 20, Y is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen group, or a nitro group, and e and f which may be the same or different each is an integer of from 0 to 4, which comprises reacting a thioether bond-containing aromatic

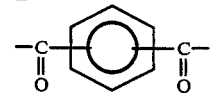

is a terephthalic acid residue and/or an isophthalic acid residue, X is a divalent hydrocarbon group having from 1 to 10 carbon atoms, —O—, —S—, —SO—, —SO$_2$—, or —CO—, a is 0 or 1; when a is 0, the aromatic rings are linked directly to each other without X, Y which may be the same or different is an alkyl group having from 1 to 20 carbon atoms, a cycloalkyl group having from 3 to 20 carbon atoms, an aryl group having from 6 to 20 carbon atoms, a halogen group, or a nitro group, b and c which may be the same or different each is an integer of from 0 to 4, d is an integer of from 0 to 20, and e and 4 which may be the same or different each is an integer of from 0 to 4.

Representative examples of the thioether bond-containing aromatic diamines of the formula (I) which are used in the second and third inventions are 2,2-bis[4-(4-aminophenylthio)phenyl]propane, 1,1,1,3,3,3-hexafluoromethyl-2,2-bis[4-(4-aminophenylthio)phenyl]propane, 4,4'-bis(4-aminophenylthio)diphenyl ether, 4,4'-bis(4-aminophenylthio)benzophenone, 4,4'-bis(4aminophenylthio)diphenylsulfoxide, 4,4'-bis(4-aminophenylthio)diphenylsulfone, 3,3'-bis(4-aminophenylthio)diphenylsulfone, 4,4'-bis(4-aminophenylthio)biphenyl and 2,2',6,6'-tetramethyl-4,4'-bis(4-aminophenylthio)biphenyl.

Part (50 mol % or less, preferably from 5 to 30 mol %) of these aromatic amines may be replaced with aromatic diamines represented by the formula (II):

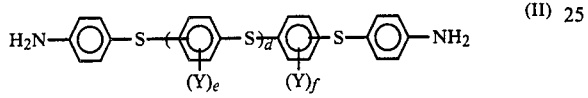

(II)

or aromatic diamines represented by the formula (VII):

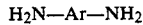

wherein Y is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen group, or a nitro group, d is an integer of from 0 to 20, e and f which may be the same or different each is an integer of from 0 to 4, and Ar is an aromatic ring having from 6 to 30 carbon atoms.

This replacement increases the solubility and moldability of the resulting aromatic polyamides.

Aromatic diamines represented by the formula (II) include 4,4'-bis(4-aminophenylthio)diphenylsulfide, 1,4-bis(4-aminophenylthio)benzene, 1,3-bis(4-aminophenylthio)benzene, and α,ω-diaminopoly(1,4-thiophenylene) oligomers.

Aromatic diamines represented by the formula (VII) include p-phenylenediamine, m-phenylenediamine, 4-methyl-1,3-phenylenediamine, 5-methyl-1,3-phenylenediamine, 4,4'-diaminobiphenyl, 4,4'-diaminodiphenyl ether, 4,4'-diaminodiphenylsulfide, 4,4'-diaminobenzophenone, 4,4'-diaminodiphenylsulfoxide, 4,4'-diaminodiphenylsulfone, 4,4'-diaminodiphenylmethane, 2,2-bis(4-aminophenyl)propane, 1,4-bis(4-aminophenoxy)benzene, 1,4-bis(4-aminobenzoyl)benzene, 1,4-bis(4-aminobenzenesulfonyl)benzene, 4,4'-bis(4-aminophenoxy)diphenyl ether, 4,4'-bis(4-aminophenoxy)diphenylsulfide, 4,4'-bis(4-aminophenoxy)benzophenone, 4,4'-bis(4-aminophenoxy)diphenylsulfone, 4,4'-bis(4-aminophenoxy)diphenylmethane, 2,2-bis[4-(4-aminophenoxy)phenyl]propane, 4,4'-bis(4-aminobenzoyl)diphenyl ether, 4,4'-bis(4-aminobenzoyl)benzophenone, 4,4'-bis(4-aminobenzoyl)diphenylsulfoxide, 4,4'-bis(4-aminobenzoyl)diphenylsulfone, 4,4'-bis(4-aminobenzoyl)diphenylmethane, 2,2-bis[4-(4-aminobenzoyl)-phenyl]propane, 4,4'-bis(4-aminobenzenesulfonyl)diphenyl ether, 4,4'-bis(4-aminobenzenesulfonyl)diphenylsulfide, 4,4'-bis(4-aminobenzenesulfonyl)benzophenone, 4,4'-bis(4-aminobenzenesulfonyl)diphenylsulfoxide, 4,4'-bis(4aminobenzenesulfonyl)diphenylsulfone, 4,4'-bis(4-aminobenzenesulfonyl)diphenylmethane, and 2,2-bis[4-(4-aminobenzenesulfonyl)phenyl]propane.

Thioether bond-containing aromatic diamines as used in the fifth invention are compounds represented by the formula (II). Part (50 mol % or less, preferably from 5 to 30 mol %) of the aromatic amines of the formula (II) may be replaced with the aromatic diamines represented by the formula (I) or aromatic diamines represented by the formula (VII). This replacement increases the solubility and moldability of the resulting aromatic polyamides.

The thioether bond-containing aromatic diamines of the formula (II) are prepared by reacting aromatic dihalogen compounds represented by the formula (VIII):

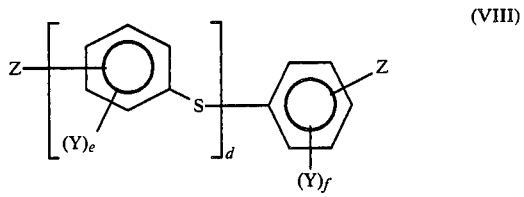

(VIII)

and p-aminothiophenol alkali metal salts in a non-protonic polar solvent as described in, for example, Japanese Patent Application No. 45221/84. In the formula (VIII), Y is an alkyl group having from 1 to 20 carbon atoms, a cycloalkyl group having from 6 to 20 carbon atoms, an aralkyl group having from 6 to 20 carbon atoms, an aryl group having from 6 to 20 carbon atoms, a halogen group, or a nitro group, d is an integer of from 0 to 20, e and f which may be the same or different each is an integer of 0 to 4, and Z is a halogen atom selected from F, Cl, Br, and I.

Aromatic dihalogen compounds represented by the formula (VIII) include 1,4-dichlorobenzene, 1,4-dibromobenzene, 1,4-diiodobenzene, 1,3-dichlorobenzene, 1,3-dibromobenzene, 2,4-dichloronitrobenzene, 2,5-dichlorotoluene, 2,5-dichloro-p-xylene, 2,5-dichloroiodobenzene, 4,4'-dichlorodiphenylsulfide, 4,4'-dibromodiphenylsulfide, 3,3'-difluorodiphenylsulfide, 4,4'-dibromo-3,3'-dimethyldiphenylsulfide, 1,4-bis(4-chlorophenylthio)benzene, 1,4-bis(4-bromophenylthio)benzene, 1,3-bis(4-chlorophenylthio)benzene, 1,3-bis(4-bromophenylthio)benzene, 1,3-bis(3-chlorophenylthio)benzene, 1,3-bis(3-bromophenylthio)benzene, 1,4-bis(4-chlorophenylthio)diphenylsulfide, 1,4-bis(4-bromophenylthio)diphenylsulfide, α,ω-dichloropoly(1,4-thiophenylene) oligomers, α,ω-dibromopoly(1,4-thiophenylene) oligomers, α,ω-dichloropoly(1,3-thiophenylene) oligomers, and α,ω-dibromopoly(1,3-thiophenylene) oligomers.

p-Aminothiophenol alkali metal salts are prepared from p-aminothiophenol and basic alkali metal salts. Typical examples of such basic alkali metal salts which can be used for this purpose include alkali metal hydroxides, alkali metal carbonate, alkali metal alkoxides, alkali metal hydrides, and alkali metal alkyl compounds.

p-Aminothiophenol which is a starting material for the p-aminothiophenol alkali metal salts is prepared by reacting p-chloronitrobenzene with sodium sulfide.

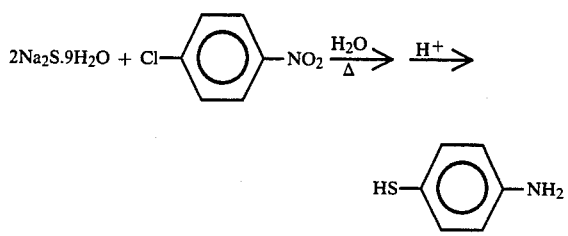

This p-aminothiophenol may be used in a pure form which is obtained through distillation or as a crude product in the subsequent reaction with the aromatic dihalogen compounds.

Basic alkalis which can be used include sodium hydroxide, potassium hydroxide, lithium hydroxide, cesium hydroxide, rubidium hydroxide, sodium carbonate, potassium carbonate, lithium carbonate, rubidium carbonate, cesium carbonate, sodium methoxide, sodium ethoxide, potassium tert-butoxide, sodium hydride, potassium hydride, lithium hydride, n-butyllithium, sec-butyllithium, and tert-butyllithium. Of these compounds, sodium hydroxide, potassium hydroxide, sodium carbonate, and potassium carbonate are preferred for practical use.

If the p-aminothiophenol alkali metal salts and the aromatic dihalogen compounds represented by the formula (I) are reacted in a non-protonic polar solvent such as organic acid amides, organic sulfoxides, and organic sulfones, the desired products can be obtained in high yields.

Non-protonic polar solvents which can be used include N,N-dimethylformamide, N,N-dimethylacetamide, N,N-dimethylpropionamide, N,N-dimethylbenzamide, N-methylpyrrolidone, N-methylpiperidone, N-methyl-ξ-caprolactam, hexamethylphosphoramide, tetramethyl urea, sulforane, dimethyl sulfoxide, and mixtures thereof. Of these compounds, N,N-dimethylformamide, N,N-dimethylacetamide, N-methylpyrrolidone, and dimethyl sulfoxide are preferred.

The amount of the non-protonic polar solvent used is from 50 to 500 parts by weight per 100 parts by weight of the sum of the aromatic dihalogen compound and p-aminothiophenol alkali metal salt.

The reaction of the aromatic dihalogen compound with the p-aminothiophenol alkali metal salt is carried out in a temperature range of from 100° to 250° C., preferably from 120° to 220° C. The reaction time is from 0.5 to 20 hours and preferably from 1 to 12 hours. The reaction is preferably carried out in a nitrogen atmosphere.

In the case that water is by-produced in preparing the p-aminothiophenol alkali metal salt, a solvent forming an azeotrope with water is preferably added to the reaction mixture so that water can be removed as an azeotropic mixture, resulting in increasing the yield.

When the above azeotropic dehydration method is used, even if p-aminothiophenol is reacted in a crude form without purification, the desired diamine compound can be obtained in a sufficiently high yield and, as a result, a step of purification of p-aminothiophenol can be omitted.

Any solvents can be used in the azeotropic distillation so long as they form an azeotrope with water, are incompatible with water, and have a specific gravity smaller than that of water. From a standpoint of preventing side reactions, hydrocarbon solvents are preferably used. These hydrocarbon solvents may be chain-like or cyclic. Of aliphatic hydrocarbons, saturated hydrocarbons are preferred. Moreover, it is preferred for the boiling point thereof to be from 80° to 200° C. Representative examples of such solvents are heptane, octane, nonane, decane, undecane, cyclohexane, methylcyclohexane, dimethylcyclohexane, cycloheptane, cyclooctane, benzene, toluene, xylene, ethylbenzene, cumene, propylbenzene, butylbenzene, and mixtures thereof. Particularly preferred are benzene, toluene, xylene, and ethylbenzene.

The amount of the azeotropic solvent used is 50 vol % or less, preferably from 5 to 20 vol %, based on the volume of the reaction solvent.

The p-aminothiophenol alkali metal salt solution is prepared in a temperature range of from 0° to 220° C., preferably from 20° to 180° C. The reaction time is from 10 minutes to 10 hours and preferably from 30 minutes to 3 hours. In this case, if water is byproduced, water is preferably distilled away from the reaction system. For this purpose, the above-described azeotropic solvents may be added to remove water as an azeotropic mixture. This is particularly effective when the aromatic dihalogen compound has a low reactivity. In this operation, the aromatic dihalogen compound may be previously present in the reaction system.

The reaction mixture of the aromatic dihalogen compound and p-aminothiophenol alkali metal salt is poured into water, and the precipitate thus formed is filtered off, washed with water to remove inorganic salts and then washed with methanol, whereby the desired diamine compound of the formula (I) can be obtained in a purified form.

The thioether bond-containing aromatic diamines of the formula (I) are prepared by reacting the aromatic dihalogen compounds represented by the formula (IX) below with the p-aminothiophenol alkali metal salts in the same manner as in the preparation of the diamines of the formula (III) (see Japanese Patent Application No. 43469/84).

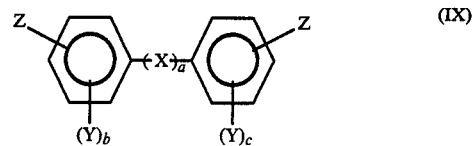

(IX)

wherein X is a divalent hydrocarbon group having from 1 to 10 carbon atoms, —O—, —S—, —SO—, —SO$_2$—, or —CO—, a is 0 or 1; when a is 0, the aromatic rings are linked directly to each other without X, Y which may be the same or different is an alkyl group having from 1 to 20 carbon atoms, a cycloalkyl group having from 6 to 20 carbon atoms, an aralkyl group having from 6 to 20 carbon atoms, an aryl group having from 6 to 20 carbon atoms, a halogen group, or a nitro group, b and c which may be the same or different each is an integer of from 0 to 4, and Z is a halogen atom selected from F, Cl, Br and I.

Aromatic dihalogen compounds represented by the formula (IX) include 4,4'-dichlorobiphenyl, 4,4'-dibromobiphenyl, 3,3'-difluorobiphenyl, 4,4'-dichlorodiphenyl ether, 4,4'-dibromodiphenyl ether, 3,3'-difluorodiphenyl ether, 4,4'-dichloro-3-methyldiphenyl ether, 4,4'-dichlorodiphenyl sulfide, 4,4'-dibromodiphenyl sulfide, 3,3'-difluorodiphenyl sulfide, 4,4'-dibromo-3,3'-dimethyldiphenyl sulfide, 4,4'-dichlorodiphenyl sulfoxide, 4,4'-dibromodiphenyl sulfoxide, 3,3'-difluorodiphenyl sulfoxide, 4,4'-dichlorodiphenyl sulfone, 4,4'-dibromodiphenyl sulfone, 3,3'-dichlorodiphenyl sulfone, 4,4'-dichloro-3,3'-dinitrodiphenyl sulfone, 4,4'-difluorobenzophenone, 4,4'-dichlorobenzophenone, 4,4'-dibromobenzophenone, 3,3'-difluorobenzophenone, 4,4'-dichloro-2,2'-dimethylbenzophenone, 4,4'-dichlorodiphenylmethane, 4,4'-dibromodiphenylmethane, 2,2-bis-(4-chlorophenyl)propane) and 2,2-bis(4-chloro-3-nitrophenyl)propane.

The thioether bond-containing aromatic diamines of the formulae (I) and (II) are useful as starting materials for the production of curing agents for epoxy resins, synthetic resins, dyes, medicines, agricultural medicines, and the like.

Aromatic Dicarboxylic Acid Chlorides

Aromatic dicarboxylic acid chlorides which are used in the present invention include terephthalic acid chloride, isophthalic acid chloride, 4,4'-diphenyldicarboxylic acid chloride, 4,4'-diphenyletherdicarboxylic acid chloride, 4,4'-diphenylsulfidedicarboxylic acid chloride, 4,4'-benzophenonedicarboxylic acid chloride, 4,4'-diphenylsulfonedicarboxylic acid chloride, 4,4'-diphenylmethanedicarboxylic acid chloride and 1,5-naphthalenedicarboxylic acid chloride.

Aromatic Dicarboxylic Acids

Aromatic dicarboxylic acids which are used in the present invention include terephthalic acid, isophthalic acid, 4,4'-diphenyldicarboxylic acid, 4,4'-diphenyletherdicarboxylic acid, 4,4'-diphenylsulfidedicarboxylic acid, 4,4'-benzophenonedicarboxylic acid, 4,4'-diphenylsulfonedicarboxylic acid, 4,4'-diphenylmethanedicarboxylic acid and 1,5-naphthalenedicarboxylic acid.

Production of Polyamides

Second Invention

The aromatic diamines of the formula (I) can be reacted with the aromatic dicarboxylic acid chlorides by any conventional techniques such as the interfacial polycondensation method and the solution polycondensation method.

In the interfacial polycondensation method, conventional water-soluble neutralizing agents are used Examples thereof include inorganic alkalis such as sodium hydroxide, potassium hydroxide, sodium carbonate, potassium carbonate and sodium hydrogencarbonate. The amount of the alkali used is from 0.3 to 3 equivalents, preferably from 0.5 to 1.5 equivalents per mol of the reactive group of the aromatic dicarboxylic acid chloride.

In producing the aromatic polythioetheramide by the above interfacial polycondensation method, the aromatic diamine is dispersed in an aqueous solution containing the water-soluble neutralizing agent and a solution of the aromatic dicarboxylic acid chloride in an organic solvent is added thereto. Organic solvents which can be used for this purpose include ketone solvents such as cyclohexanone, di-iso-butyl ketone, acetophenone, and p-methylacetophenone, and halogenated hydrocarbon solvents such as methylene chloride, chloroform, carbon tetrachloride, 1,1,1-trichloroethane and 1,1,2,2-tetrachloroethane. Cyclohexanone and p-methylacetophenone are preferably used to produce high molecular weight compounds. The reaction temperature is from 0° to 100° C. and preferably from 3° to 50° C. The reaction time is from 1 minute to 10 hours and preferably from 5 minutes to 3 hours.

In the solution polycondensation method, conventional tert-amines are sometimes used as neutralizing agents. Examples of these tert-amines are triethylamine, tributylamine, pyridine, quinoline, pyrimidine and 2,6-lutidine. The addition of the tert-amines, however, is not always necessary when organic acid amides are used as the reaction solvents. The amount of the neutralizing agent used is preferably from 0.3 to 3.0 equivalents per mol of the reactive group of the aromatic dicarboxylic acid chloride. As the reaction solvent, organic acid amides and organic sulfoxides are preferably used. Examples thereof are N,N-dimethylformamide, N,N-dimethylacetamide, N-methylpyrrolidone, N-methyl-ε-caprolactam, hexamethylphosphoramide, tetramethyl urea, and dimethyl sulfoxide.

In producing the aromatic polythioetheramide by the solution polycondensation method, the aromatic diamine is dissolved in the above-described reaction solvent and, if desired and necessary, the neutralizing agent is added thereto, and the aromatic dicarboxylic acid chloride is added to the above-prepared solution. In this manner, the polyamide having the following repeating unit can be obtained.

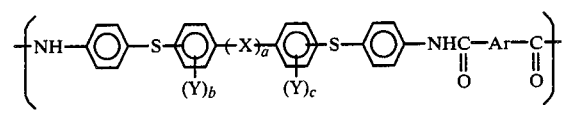

The above polyamide contains the following units when the aromatic diamines of the formula (II) or (VII) are used.

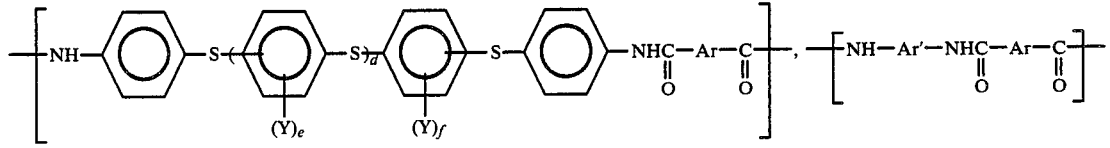 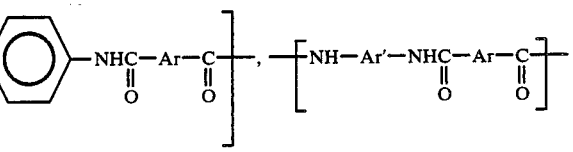

In the production of the polyamide, addition of from 5 to 10% by weight of lithium chloride, calcium chloride, calcium rhodanide, etc., to the reaction system is sometimes preferred since it results in a marked increase in solubility. In this case, the reaction temperature is from −30° to +100° C. and preferably from −20° to +30° C. The reaction time is from 5 minutes to 10 hours and preferably from 30 minutes to 5 hours.

Third Invention:

In the production of the polyamides by polycondensation of the aromatic diamines of the formula (I) and aromatic dicarboxylic acids, conventional techniques such as a direct polycondensation method can be employed.

The aromatic polythioetheramide polymers of the present invention can be produced by dissolving the aromatic diamines and aromatic dicarboxylic acids in organic acid amides or organic sulfoxides and then, after addition of tert-amines or the like as condensation agents, reacting them. Solvents which can be used for this purpose include N,N-dimethylformamide, N,N-dimethylacetamide, N-methylpyrrolidone, N-methyl-ε-caprolactam, hexamethylphosphoramide, tetramethyl urea and dimethyl sulfoxide. Condensation agents which are preferably used include phosphorus-based compounds such as triphenyl phosphite. Tert-amines which can be used include pyridine, quinoline, pyrimidine, 2,6-lutidine, triethylamine and tributylamine. The amount of the condensation agent used is preferably from 1 to 2 equivalents per mol of the reactive group of the aromatic dicarboxylic acid. The tert-amines may be used in an excess amount. If desired and necessary, from 1 to 10% by weight of lithium chloride, calcium chloride, calcium rhodanide or the like may be added to obtain favorable results. The reaction temperature is from 0° to 200° C. and the reaction time is from 30 minutes to 20 hours.

carbon atoms, an aralkyl group having from 6 to 20 carbon atoms, an aryl group having from 6 to 20 carbon atoms, a halogen group, or a nitro group, b and c which may be the same or different each is an integer of from 0 to 4, and Ar is an aromatic ring having from 6 to 30 carbon atoms.

These polyamides may contain the following unit:

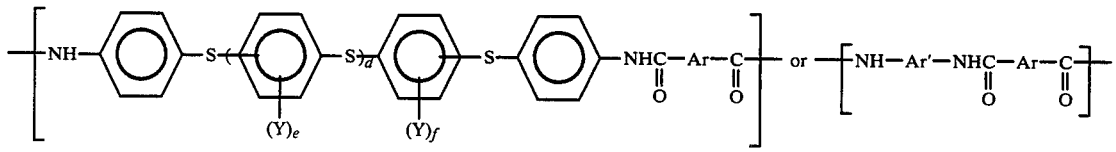

In connection with the glass transition temperature of the above-produced polyamides, homopolymers have a glass transition temperature ranging between about 150° and 280° C., and copolymers, a glass transition temperature ranging between about 200° and 350° C.

Purification

In the isolation of the polyamides produced by any of the above-described methods, a solution containing the aromatic polythioetheramide resins is diluted with a solvent which does not dissolve the polyamides but is compatible with the reaction solvent to thereby precipitate the resins which are then filtered off.

Production of Polyamides

Fifth and Sixth Inventions

Polyamides having the following repeating unit:

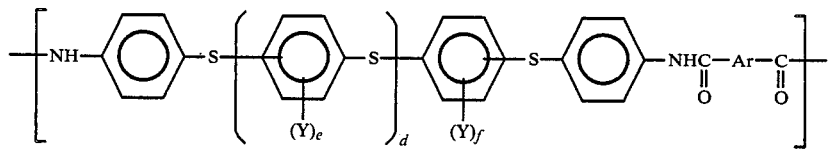

Polyamides

The polyamides produced by the first invention are aromatic polythioetheramide polymers having the following repeating unit:

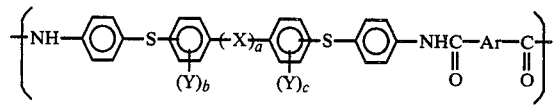

wherein X is a divalent hydrocarbon group having from 1 to 10 carbon atoms, —O—, —S—, —SO—, —SO$_2$—, or —CO—, a is 0 or 1; when a is 0, the aromatic rings are linked directly to each other, Y which may be the same or different is an alkyl group having from 1 to 20 carbon atoms, a cycloalkyl group having from 3 to 20 wherein d is an integer of from 0 to 20, Y is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen group, or a nitro group, e and f which may be the same or different each is an integer of from 0 to 4, and Ar is an aromatic ring having from 6 to 30 carbon atoms, can be produced in the same manner as in the second and third inventions except that the aromatic diamines of the formula (II) are used as the thioether bond-containing aromatic diamines (the fourth invention).

When the aromatic diamines of the formula (I) or (VII) are used, the resulting polyamides contain the following units.

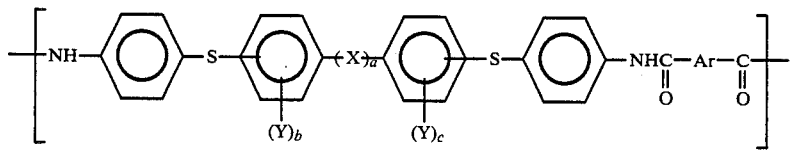

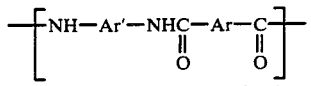

wherein X is a divalent hydrocarbon group having from 1 to 10 carbon atoms, —O—, —S—, —SO—, —SO₂— or —CO—, a is 0 or 1; when a is 0, the aromatic rings are linked directly to each other without X, Y which may be the same or different is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen group, or a nitro group, b and c which may be the same or different each is an integer of from 0 to 4, and Ar and Ar' each is an aromatic ring having from 6 to 30 carbon atoms.

Polyamides

Seventh Invention.

In order to increase the heat resistance of polyamides, the following compound can be used as the aromatic diamine of the formula (VII) in an amount of 50% or more of the diamine component.

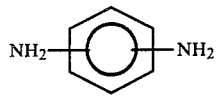

This results in the production of aromatic polyamide copolymer comprising from 51 to 99 mol % of the repeating unit of the formula (III), and from 49 to 1 mol % of the repeating unit of the formula (IV) and/or the repeating unit of the formula (V).

linked together to each other without X, Y which may be the same or different is an alkyl group having from 3 to 20 carbon atoms, a cycloalkyl group having from 3 to 20 carbon atoms, an aryl group having from 6 to 20 carbon atoms, a halogen group, or a nitro group, b and c which may be the same or different each is an integer of from 0 to 4, d is an integer of from 0 to 20, and e is an integer of from 0 to 4.

Production

These aromatic polyamide copolymers are produced by polycondensating a diamine mixture of from 51 to 99 mol % of an aromatic diamine represented by the formula:

$$H_2N-Ar-NH_2$$

and from 49 to 1 mol % of an aromatic diamine represented by the formula (I) and/or the formula (II):

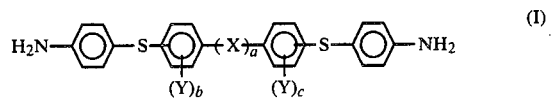 (I)

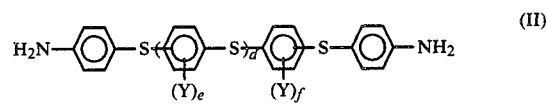 (II)

with (III)

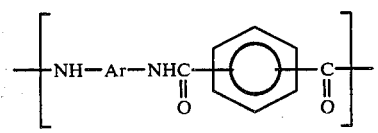

(IV)

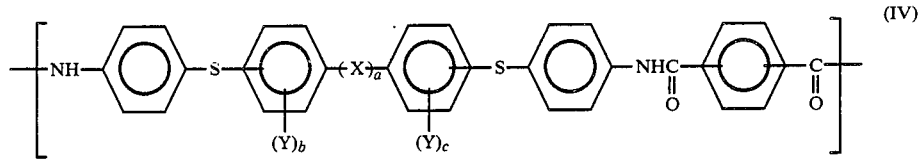

(V)

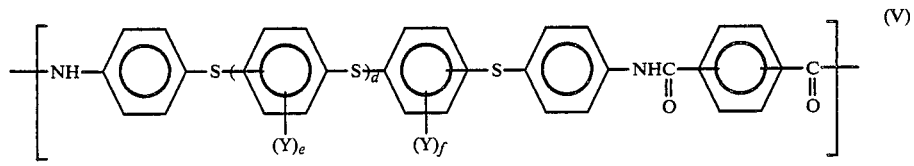

wherein Ar is an aromatic ring having from 6 to 20 carbon atoms,

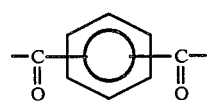

is a residue of terephthalic acid and/or isophthalic acid, X is a divalent hydrocarbon group having from 1 to 10 carbon atoms, —O—, —S—, —SO—, —SO₂— or —CO—, a is 0 or 1; when a is 0, the aromatic rings are

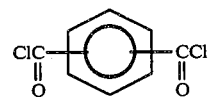

(terephthalic acid chloride and/or isophthalic acid chloride). In the above formulae, Ar, X, Y, a, b, c, d and e are the same as defined in the formulae (I), (II) and (III).

This is carried out according to the second invention.

Purification

An aromatic polythioetheramide polymer-containing solution produced by the above-described methods is diluted with a solvent which cannot dissolve the polymer but is compatible with the reaction solvent to thereby precipitate the polymer. By separation of the polymer by filtration, the desired polyamide is isolated.

Molding and Uses

In molding of the polymer of the present invention, various conventional fillers can be added. Typical examples of such fillers include (a) fibrous fillers such as glass fibers, carbon fibers, boron fibers, aramide fibers, alumina fibers, and silicon/carbide fibers, and (b) inorganic fillers such as mica, talc, clay, graphite, carbon black, silica, asbestos, molybdenum sulfide, magnesium oxide and calcium oxide.

The polyamides of the present invention can be widely used as parts for the electric and electronic field, housings, car parts, air plane interior materials, sliding parts, gears, insulating materials, heat resistant films, heat resistant varnish, heat resistant fibers and so forth.

The present invention is described in greater detail by reference to the following non-limiting examples.

EXAMPLE 1

A solution of 2.0 g of sodium hydroxide dissolved in 40 ml of water was placed in a 1 liter three-necked flask equipped with a stirrer, a thermometer and a dropping funnel. 5.80 g of 4,4'-bis(4-aminophenylthio)diphenylsulfone and 2.50 g of 4,4'-diaminodiphenyl ether were added and dispersed by vigorously stirring at 5° C.

A mixture of 2.54 g of terephthalic acid chloride and 2.54 g of isophthalic acid chloride was dissolved in 120 ml of cyclohexanone, and the resulting acid chloride solution was introduced into the flask through the dropping funnel. During this period, the reaction temperature was maintained at 15° C. or less. After 20 minutes, 100 ml of water and 80 ml of cyclohexanone were added to the reaction mixture, and 200 ml of acetone was then poured to precipitate a polymer.

The polymer was separated by filtration, washed with hot water, and then dried in a vacuum oven at 100° C. for 8 hours. The amount of the polymer was 11.6 g (yield: 100%). The glass transition temperature of the polymer was 208° C., and the inherent viscosity (as determined at 30° C. as a 0.5% DMSO solution) was 0.89 dl/g.

In an infrared absorption spectrum of the polymer, the following absorption bands were observed: absorption bands attributable to the amide at 1,640 and 1,515 $cm^{-1}$; absorption band attributable to the ether at 1,240 $cm^{-1}$; absorption band attributable to the sulfone at 1,145 $cm^{-1}$; absorption band attributable to the thioether at 1,070 $cm^{-1}$; and absorption band attributable to the aromatic ring at 805 $cm^{-1}$.

EXAMPLE 2

Following the procedure of Example 1, a polymer was produced using the following ingredients.

| | | |
|---|---|---|
| Sodium hydroxide | 2.0 | g |
| Water | 40 | ml |
| 4,4'-Bis(4-aminophenylthio)biphenyl | 10.0 | g |
| Terephthalic acid chloride | 2.54 | g |
| Isophthalic acid chloride | 2.54 | g |
| Cyclohexanone | 120 | ml |

The analytical data of the polymer were as follows:
Amount of the polymer: 13.2 g (yield: 100%)
Glass transition temperature: 250° C.
Inherent viscosity (0.2% NMP solution, 30° C.): 0.45 dl/g
IR spectrum (as shown in FIG. 1): 1,640, 1,520 $cm^{-1}$ (amide), 1,080 $cm^{-1}$ (thioether), 805 $cm^{-1}$ (aromatic ring).

EXAMPLE 3

A solution of 10.7 g of 4,4'-bis(4-aminophenylthio)benzophenone dissolved in 50 ml of dry N-methylpyrrolidone was placed in a 500 ml three-necked flask equipped with a stirrer, a thermometer, and a dropping funnel. While stirring at −5° C., a solution of 5.08 g of isophthalic acid chloride dissolved in 50 ml of dry N-methylpyrrolidone was introduced through the dropping funnel. During this period, the reaction temperature was maintained at 0° C. or less. The mixture was stirred for 2 hours at 0° C. The reaction mixture was then poured into acetone to precipitate a polymer.

The polymer was separated by filtration, washed with hot water, and dried in a vacuum oven at 100° C. for 8 hours.

The analytical data of the polymer were as follows:
Amount of the polymer: 14.0 g (yield: 100%)
Glass transition temperature: 231° C.
Inherent viscosity (0.5% DMSO solution, 30° C.): 0.99 dl/g
IR spectrum: 1,640, 1,512 $cm^{-1}$ (amide), 1,640 $cm^{-1}$ (ketone), 1,070 $cm^{-1}$ (thioether), and 810 $cm^{-1}$ (aromatic ring).

EXAMPLE 4

Following the procedure of Example 1, polyamide was produced using the following ingredients.

| | | |
|---|---|---|
| Sodium hydroxide | 2.0 | g |
| Water | 40 | ml |
| 4,4'-Bis(4-aminophenylthio)benzophenone | 10.7 | g |
| Terephthalic acid chloride | 2.54 | g |
| Isophthalic acid chloride | 2.54 | g |
| Cyclohexanone | 120 | ml |

Figure 2:
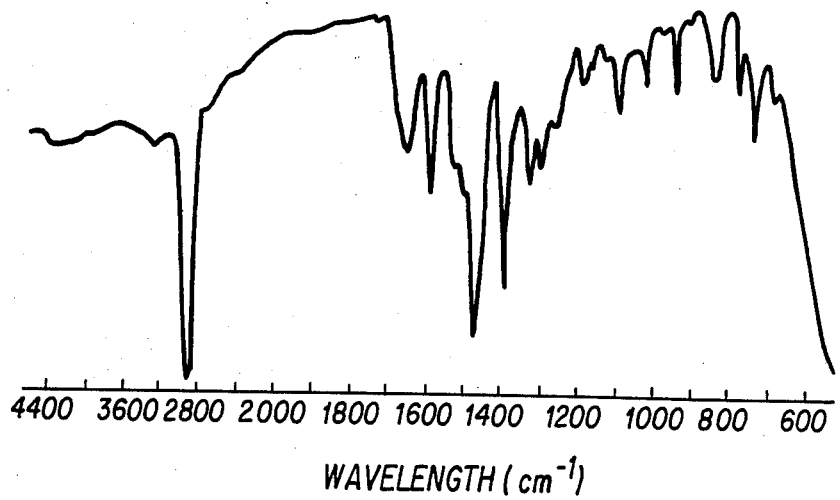

The analytical data of the polymer were as follows:
Amount of the polymer: 14.0 g (yield: 100%)
Glass transition temperature: 229° C.
Softening point: 322° C.
Inherent viscosity (0.5% DMSO solution, 30° C.): 0.45 dl/g
IR spectrum (as shown in FIG. 2): 1,645, 1,520 $cm^{-1}$ (amide), 1,645 $cm^{-1}$ (ketone), 1,080 $cm^{-1}$ (thioether), 825 $cm^{-1}$ (aromatic ring).

EXAMPLE 5

Following the procedure of Example 1, a polymer was produced using the following ingredients.

| | | |
|---|---|---|
| Sodium hydroxide | 2.0 | g |
| Water | 40 | ml |
| 4,4'-Bis(4-aminophenylthio)benzophenone | 10.7 | g |
| Terephthalic acid chloride | 1.02 | g |
| Isophthalic acid chloride | 4.06 | g |

-continued

| | | |
|---|---|---|
| | Cyclohexanone | 120 ml |

The analytical data of the polymer were as follows:
Amount of the polymer: 13.9 g (yeild: 99%)
Glass transition temperature: 227° C.
Softening point: 300° C.
Inherent viscosity (0.5% DMSO solution, 30° C.): 0.88 dl/g
IR spectrum: 1,640, 1,510 cm$^{-1}$ (amide), 1,640 cm$^{-1}$ (ketone), 1,070 cm$^{-1}$ (thioether), and 810 cm$^{-1}$ (aromatic ring).

The polymer thus obtained was compression molded at 320° C. to provide a pale yellow tough resin plate.

EXAMPLE 6

Following the procedure of Example 1, polyamide was produced using the following ingredients.

| | | |
|---|---|---|
| { | Sodium hydroxide | 2.0 g |
| | Water | 40 ml |
| | 4,4'-Bis(4-aminophenylthio)diphenyl-sulfone | 11.6 g |
| { | Isophthalic acid chloride | 5.08 g |
| | Cyclohexanone | 120 ml |

The analytical data of the polyamide were as follows.
Amount of the polymer: 14.7 g (yield: 99%)
Glass transition temperature: 188° C.
Softening point: 262° C.
Inherent viscosity (0.5% DMSO solution, 30° C.): 0.41 dl/g
IR spectrum: 1,650, 1,510 cm$^{-1}$ (amide), 1,150 cm$^{-1}$ (sulfone), 1,070 cm$^{-1}$ (thioether), and 810 cm$^{-1}$ (aromatic ring).

EXAMPLE 7

Following the procedure of Example 1, polyamide was produced using the following ingredients.

| | | |
|---|---|---|
| { | Sodium hydroxide | 2.0 g |
| | Water | 40 ml |
| | 4,4'-Bis(4-aminophenylthio)diphenyl-sulfone | 11.6 g |
| { | Terephthalic acid chloride | 2.54 g |
| | Isophthalic acid chloride | 2.54 g |
| | Cyclohexanone | 120 ml |

Figure 3:
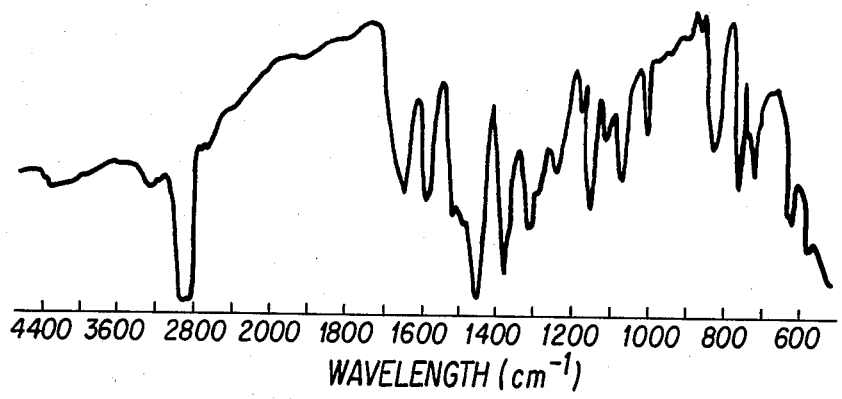

The analytical data of the polyamide were as follows:
Amount of the polymer: 14.9 g (yield: 100%)
Glass transition temperature: 199° C.
Softening point: 284° C.
Inherent viscosity (0.5% DMSO solution, 30° C.): 0.63 dl/g
IR spectrum (as shown in FIG. 3): 1,640, 1,510 cm$^{-1}$ (amide), 1,150 cm$^{-1}$ (sulfone), 1,070 cm$^{-1}$ (thioether), and 815 cm$^{-1}$ (aromatic ring).

EXAMPLE 8

Following the procedure of Example 1, polyamide was produced using the following ingredients.

| | | |
|---|---|---|
| { | Sodium hydroxide | 2.0 g |
| | Water | 40 ml |
| | 4,4'-Bis(4-aminophenylthio)diphenyl-sulfone | 5.80 g (50 mol %) |

-continued

| | | |
|---|---|---|
| | 1,4-Bis(4-aminophenylthio)benzene | 4.05 g (50 mol %) |
| { | Terephthalic acid chloride | 2.54 g |
| | Isophthalic acid chloride | 2.54 g |
| | Cyclohexanone | 120 ml |

The analytical data of the polyamide were as follows.
Amount of the polymer: 13.1 g (yield: 100%)
Glass transition temperature: 243° C.
Inherent viscosity (0.5% DMSO solution, 30° C.): 0.54 dl/g
IR spectrum: 1,640, 1,510 cm$^{-1}$ (amide), 1,145 cm$^{-1}$ (sulfone), 1,070 cm$^{-1}$ (thioether), and 805 cm$^{-1}$ (aromatic ring).

EXAMPLE 9

Following the procedure of Example 1, polyamide was produced using the following ingredients.

| | | |
|---|---|---|
| { | Sodium hydroxide | 2.0 g |
| | Water | 40 ml |
| | 4,4'-Bis(4-aminophenylthio)diphenyl-sulfone | 5.80 g (50 mol %) |
| | 4,4'-Bis(4-aminophenylthio)diphenyl sulfide | 5.40 g (50 mol %) |
| { | Terephthalic acid chloride | 2.54 g |
| | Isophthalic acid chloride | 2.54 g |
| | Cyclohexanone | 120 ml |

The analytical data of the polyamide were as follows.
Amount of the polymer: 14.5 g (yield: 99%)
Glass transition temperature: 230° C.
Inherent viscosity (0.5% DMSO solution, 30° C.): 0.55 dl/g
IR spectrum: 1,640, 1,510 cm$^{-1}$ (amide), 1,145 cm$^{-1}$ (sulfone), 1,070 cm$^{-1}$ (thioether), and 805 cm$^{-1}$ (aromatic ring).

EXAMPLE 10

Following the procedure of Example 1, polyamide was produced using the following ingredients.

| | | |
|---|---|---|
| { | Sodium hydroxide | 2.0 g |
| | Water | 40 ml |
| | 4,4'-Bis(4-aminophenylthio)benzophenone | 5.35 g (50 mol %) |
| | 4,4'-Diamino diphenyl ether | 2.50 g (50 mol %) |
| { | Terephthalic acid chloride | 2.54 g |
| | Isophthalic acid chloride | 2.54 g |
| | Cyclohexanone | 120 ml |

The analytical data of the polymer were as follows.
Amount of the polymer: 11.2 g (yield: 100%)
Glass transition temperature: 241° C.
Inherent viscosity (0.5% DMSO solution, 30° C.): 0.88 dl/g
IR spectrum: 1,640, 1,510 cm$^{-1}$ (amide), 1,640 cm$^{-1}$ (ketone), 1,240 cm$^{-1}$ (ether), 1,070 cm$^{-1}$ (thioether), and 805 cm$^{-1}$ (aromatic ring).

EXAMPLE 11

Following the procedure of Example 1, polyamide was produced using the following ingredients.

| | | |
|---|---|---|
| | Sodium hydroxide | 2.0 g |
| | Water | 40 ml |

|   | -continued | |
|---|---|---|
| { | 4,4'-Bis(4-aminophenylthio)benzophenone | 5.35 g (50 mol %) |
| | 1,4-Bis(4-aminophenylthio)benzene | 4.05 g (50 mol %) |
| { | Terephthalic acid chloride | 2.54 g |
| | Isophthalic acid chloride | 2.54 g |
| | Cyclohexanone | 120 ml |

The analytical data of the polyamide were as follows:
Amount of the polymer: 12.7 g (yield: 100%)
Glass transition temperature: 232° C.
Inherent viscosity (0.5% DMSO solution, 30° C.): 0.61 dl/g
IR spectrum: 1,640, 1,510 cm$^{-1}$ (amide), 1,640 cm$^{-1}$ (ketone), 1,070 cm$^{-1}$ (thioether), and 805 cm$^{-1}$ (aromatic ring).

The polymer was compression molded at 300° C. to provide an ocherous tough resin plate.

EXAMPLE 12

A solution of 2.0 g of sodium hydroxide dissolved in 40 ml of water was placed in a 1 liter three-necked flask equipped with a stirrer, a thermometer and a dropping funnel. 8.10 g of 1,4-bis(4-aminophenylthio)benzene was added to and dispersed in the above aqueous solution by sitrring vigorously at 5° C. A solution of 5.08 g of isophthalic acid chloride dissolved in 120 ml of cyclohexanone was introduced into the flask through the dropping funnel. During this period, the reaction temperature was maintained at 15° C. or less.

After 20 minutes, 100 ml of water and 80 ml of cyclohexanone were added to the reaction mixture and 200 ml of acetone was then poured thereto to precipitate a polymer. This polymer was separated by filtration, washed with hot water, and then dried in a vacuum oven at 100° C. for 8 hours. The amount of the polymer was 11.4 g (yield: 100%). The glass transition temperature of the polymer was 258° C., and the softening point was 368° C. The inherent viscosity as determined at 30° C. as a 0.5% DMSO solution was 0.37 dl/g.

In the infrared absorption spectral analysis of the polymer, the following absorption bands were observed: 1,640, 1,505 cm$^{-1}$ (attributable to the amide), 1,070 cm$^{-1}$ (attributable to the thioether), and 805 cm$^{-1}$ (attributable to the aromatic ring).

EXAMPLE 13

Following the procedure of Example 12, polyamide was produced using the following ingredients.

| { | Sodium hydroxide | 2.0 g |
|---|---|---|
| | Water | 40 ml |
| | 1,4-Bis(4-aminophenylthio)benzene | 8.10 g |
| { | Terephthalic acid chloride | 2.54 g |
| | Isophthalic acid chloride | 2.54 g |
| | Cyclohexanone | 120 ml |

Figure 4:
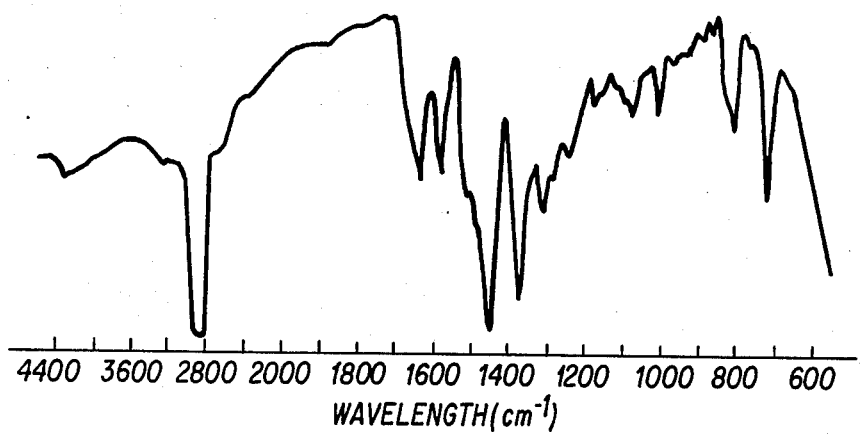
FIGS. 4, 5 and 6 each is an infrared absorption spectrum of the polyamide produced in Examples 13, and 17, respectively.

The analytical data of the polyamide were as follows:
Amount of the polymer: 11.2 g (yield: 98%)
Glass transition temperature: 260° C.
Softening point: 388° C.
Inherent viscosity (0.4% DMSO solution, 30° C.): 0.40 dl/g
IR spectrum (as shown in FIG. 4): 1,640, 1,515 cm$^{-1}$ (amide), 1,075 cm$^{-1}$ (thioether), and 810 cm$^{-1}$ (aromatic ring).

EXAMPLE 14

Following the procedure of Example 12, polyamide was produced using the following ingredients.

| { | Sodium hydroxide | 2.0 g |
|---|---|---|
| | Water | 40 ml |
| | 4,4'-Bis(4-aminophenylthio)diphenyl sulfide | 10.8 g |
| { | Isophthalic acid chloride | 5.08 g |
| | Cyclohexanone | 120 ml |

The analytical data of the polyamide were as follows:
Amount of the polymer: 14.1 g (yield: 99%)
Glass transition temperature: 192° C.
Softening point: 335° C.
Inherent viscosity (0.2% NMP solution, 30° C.): 0.51 dl/g
IR spectrum: 1,640, 1,510 cm$^{-1}$ (amide), 1,070 cm$^{-1}$ (thioether), and 850 cm$^{-1}$ (aromatic ring).

EXAMPLE 15

Following the procedure of Example 12, a polymer was produced using the following ingredients.

| { | Sodium hydroxide | 2.0 g |
|---|---|---|
| | Water | 40 ml |
| | 4,4'-Bis(4-aminophenylthio)diphenyl sulfide | 10.8 g |
| { | Terephthalic acid chloride | 2.54 g |
| | Isophthalic acid chloride | 2.54 g |
| | Cyclohexanone | 120 ml |

Figure 5:
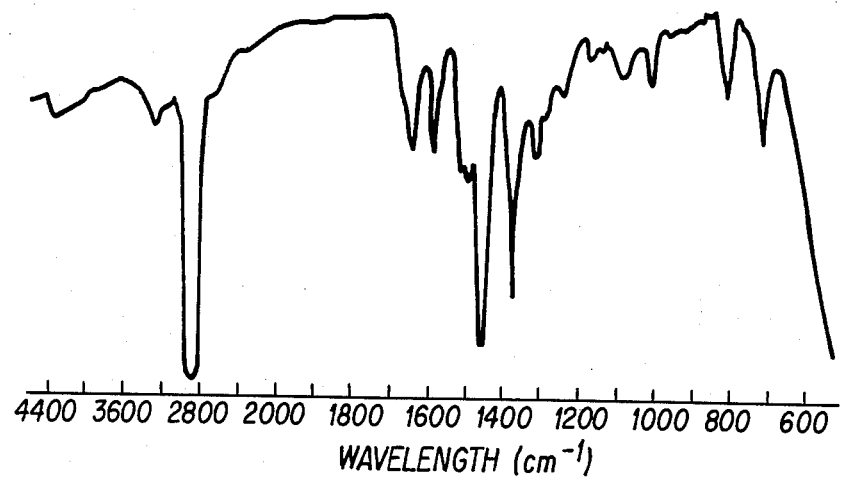

The analytical data of the polymer were as follows:
Amount of the polymer: 14.1 g (yield: 99%)
Glass transition temperature: 198° C.
Softening point: 357° C.
Inherent viscosity (0.2% NMP solution, 30° C.): 0.38 dl/g
IR spectrum (as shown in FIG. 5): 1,640, 1,515 cm$^{-1}$ (amide), 1,080 cm$^{-1}$ (thioether), and 810 cm$^{-1}$ (aromatic ring).

EXAMPLE 16

Following the procedure of Example 12, polyamide was produced using the following ingredients.

| { | Sodium hydroxide | 2.0 g |
|---|---|---|
| | Water | 40 ml |
| | 4,4'-Bis(4-aminophenylthio)diphenyl sulfide | 10.8 g |
| { | Terephthalic acid chloride | 1.02 g |
| | Isophthalic acid chloride | 4.06 g |
| | Cyclohexanone | 120 ml |

The analytical data of the polyamide were as follows:
Amount of the polymer: 14.2 g (yield: 100%)
Glass transition temperature: 195° C.
Softening point: 325° C.
Inherent viscosity (0.2% NMP solution, 30° C.): 0.63 dl/g
IR spectrum: 1,640, 1,515 cm$^{-1}$ (amide), 1,080 cm$^{-1}$ (thioether), and 810 cm$^{-1}$ (aromatic ring).

EXAMPLE 17

A 50 ml four-necked flask equipped with a stirrer, a thermometer, a Riibihhi condenser, and a nitrogen gas introduction tube was charged with 10.0 g of α,ω-diaminopoly(1,4-thiophenylene) oligomer (average molecular weight: 1,000), 2.03 g of terephthalic acid, 7.00 g of triphenyl phosphite, 6.00 g of lithium chloride, 40 ml of quinoline, and 120 ml of N-methylpyrrolidone, and reaction was conducted at 200° C. for 4 hours in a nitrogen stream.

Water was poured into the reaction mixture to precipitate a polymer. This polymer was separated by filtration, washed with hot water, and then dried in a vacuum oven at 100° C. for 8 hours.

Figure 6:
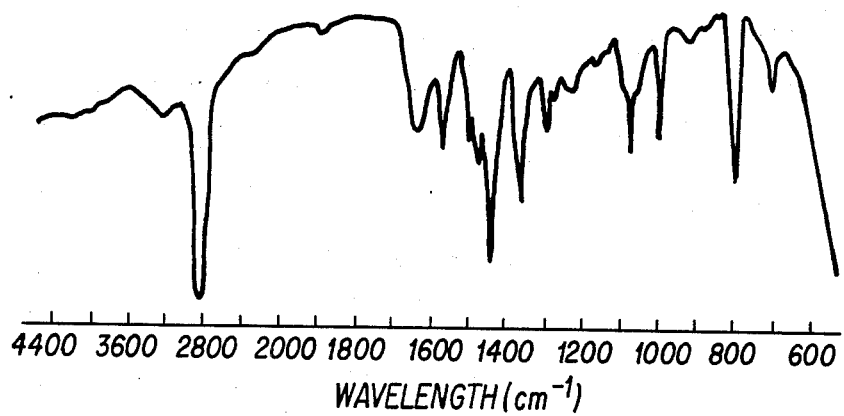

The analytical data of the polymer were as follows:
Amount of the polymer: 11.2 g (yield: 99%)
Glass transition temperature: 100° C.
Softening point: 280° C.
Inherent viscosity (0.3% quinoline solution, 30° C.): 0.12 dl/g
IR spectrum (as shown in FIG. 6): 1,645, 1,515 cm$^{-1}$ (amide), 1,085 cm$^{-1}$ (thioether), and 810 cm$^{-1}$ (aromatic ring).

EXAMPLE 18

Following the procedure of Example 12, polyamide was produced using the following ingredients.

| | | |
|---|---|---|
| Sodium hydroxide | 2.0 g | |
| Water | 40 ml | |
| 4,4'-Bis(4-aminophenylthio)diphenyl sulfone | 3.87 g (33 mol %) | |
| 4,4'-Bis(4-aminophenylthio)diphenyl sulfide | 7.20 g (67 mol %) | |
| Terephthalic acid chloride | 2.54 g | |
| Isophthalic acid chloride | 2.54 g | |
| Cyclohexanone | 120 ml | |

The analytical data of the polymer were as follows:
Amount of the polymer: 14.6 g (yield: 100%)
Glass transition temperature: 227° C.
Inherent viscosity (0.2% NMP solution, 30° C.): 0.72 dl/g
IR spectrum: 1,640, 1,510 cm$^{-1}$ (amide), 1,145 cm$^{-1}$ (sulfone), 1,070 cm$^{-1}$ (thioether), and 805 cm$^{-1}$ (aromatic ring).

EXAMPLE 19

Following the procedure of Example 12, polyamide was produced using the following ingredients.

| | |
|---|---|
| Sodium hydroxide | 2.0 g |
| Water | 40 ml |
| 4,4'-Bis(4-aminophenylthio)diphenyl sulfide | 5.40 g (50 mol %) |
| 4,4'-Bis(4-aminophenoxy)diphenyl sulfone | 5.40 g (50 mol %) |
| Terephthalic acid chloride | 2.54 g |
| Isophthalic acid chloride | 2.54 g |
| Cyclohexanone | 120 ml |

The analytical data of the polymer were as follows:
Amount of the polymer: 14.2 g (yield: 100%)
Glass transition temperature: 237° C.
Inherent viscosity (0.5% DMSO solution, 30° C.): 0.71 dl/g
IR spectrum: 1,640, 1,510 cm$^{-1}$ (amide), 1,240 cm$^{-1}$ (ehter), 1,140 cm$^{-1}$ (sulfone), 1,070 cm$^{-1}$ (thioether), and 805 cm$^{-1}$ (aromatic ring).

EXAMPLE 20

A solution of 8.0 g of sodium hydroxide dissolved in 150 ml of water was placed in a 1 liter three-necked flask equipped with a stirrer, a thermometer and a dropping funnel. Then, 8.64 g (80 mol %) of m-phenylenediamine and 9.28 g (20 mol %) of 4,4'-bis(4-aminophenylthio)diphenyl sulfone were added to and dispersed in the above aqueous solution by stirring vigorously at 5° C. A mixture of 10.15 g of isophthalic acid chloride and 10.15 g of terephthalic acid chloride was dissolved in 500 ml of cyclohexanone, and the resulting acid chloride solution was introduced into the flask through the dropping funnel. During this period, the reaction temperature was maintained at 15° C. or less. After 20 minutes, 100 ml of water and 100 ml of cyclohexanone were added to the reaction mixture, and 400 ml of acetone was then added to precipitate a polymer.

This polymer was separated by filtration, washed with hot water, and then dried in a vacuum oven at 100° C. for 8 hours. The amount of the polymer was 30.7 g (yield: 99%). The glass transition temperature of the polymer was 270° C. The inherent viscosity (0.2% NMP solution, 30° C.) was 0.61 dl/g.

In the IR spectral analysis of the polymer, the following absorption bands were observed: 1,640, 1,510 cm$^{-1}$ (amide), 1,140 cm$^{-1}$ (sulfone), 1,070 cm$^{-1}$ (thioether), and 810, 710 cm$^{-1}$ (aromatic ring).

The polymer did not decompose in the air up to 380° C. and could be shaped into an amber tough film by compression molding at 320° C.

The fluidity as determined under conditions of temperature 330° C. and load 100 kg using a Koka type flow tester was 0.10 cc/minute.

EXAMPLE 21

Following the procedure of Example 20, a polymer was produced using the following ingredients.

| | |
|---|---|
| Sodium hydroxide | 8.0 g |
| Water | 150 ml |
| m-Phenylenediamine | 8.64 g (80 mol %) |
| 4,4'-Bis(4-aminophenylthio)diphenyl sulfone | 9.28 g (20 mol %) |
| Isophthalic acid chloride | 20.3 g |
| Cyclohexanone | 500 ml |

Figures 7, 8:
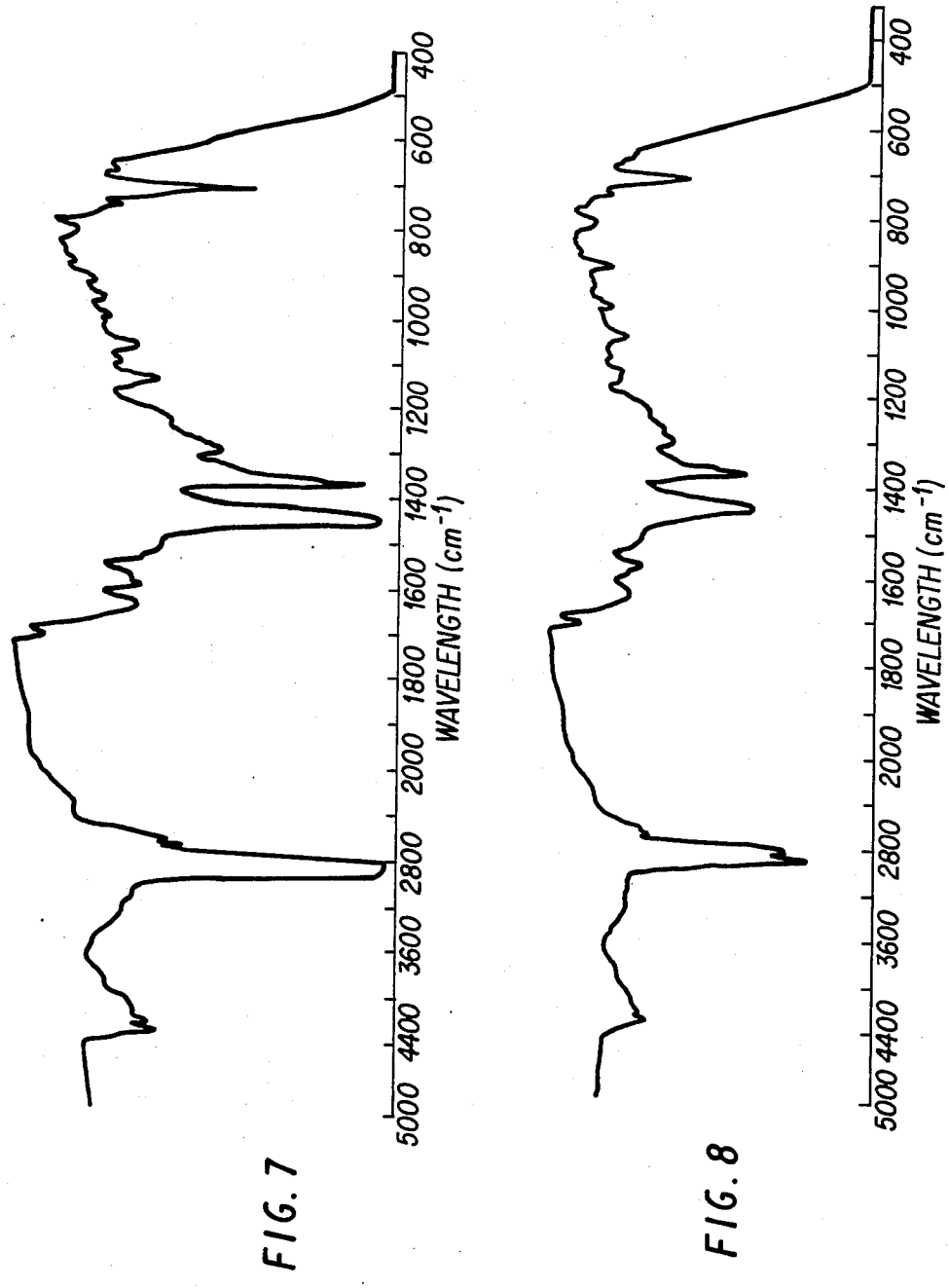
FIGS. 7 and 8 each is an infrared absorption spectrum of the aromatic polyamide copolymer produced in Examples 21 and 24, respectively.

The analytical data of the polymer were as follows:
Amount of the polymer: 30.5 g (yield: 99%)
Glass transition temperature: 266° C.
Inherent viscosity (0.2% NMP solution, 30° C.): 0.59 dl/g
IR spectrum (as shown in FIG. 7): 1,640, 1,510 cm$^{-1}$ (amide), 1,140 cm$^{-1}$ (sulfone), 1,070 cm$^{-1}$ (thioether), and 810, 710 cm$^{-1}$ (aromatic ring).

The polymer was compression molded at 320° C. to provide an amber tough film.

EXAMPLE 22

Following the procedure of Example 20, a polymer was produced using the following ingredients.

| | |
|---|---|
| Sodium hydroxide | 8.0 g |
| Water | 150 ml |
| m-Phenylenediamine | 8.64 g (80 mol %) |
| 4,4'-Bis(4-aminophenylthio)diphenyl sulfide | 8.64 g (20 mol %) |
| Isophthalic acid chloride | 20.3 g |

-continued

| | |
|---|---|
| Cyclohexanone | 500 ml |

The analytical data of the polymer were as follows:
Amount of the polymer: 29.5 g (yield: 99%)
Glass transition temperature: 243° C.
Inherent viscosity (0.2% NMP solution, 30° C.): 0.59 dl/g
IR spectrum: 1,640, 1,510 cm$^{-1}$ (amide), 1,070 cm$^{-1}$ (thioether), and 810 cm$^{-1}$ (aromatic ring).

EXAMPLE 23

Following the procedure of Example 20, a polymer was produced using the following ingredients.

| | |
|---|---|
| Sodium hydroxide | 8.0 g |
| Water | 150 ml |
| 4,4'-Diamino diphenyl ether | 11.0 g |
| | (55 mol %) |
| 4,4'-Bis(4-aminophenylthio)diphenyl sulfone | 20.9 g |
| | (45 mol %) |
| Isophthalic acid chloride | 10.15 g |
| Terephthalic acid chloride | 10.15 g |
| Cyclohexanone | 500 ml |

The analytical data of the polymer were as follows:
Amount of the polymer: 44.0 g (yield: 98%)
Glass transition temperature: 210° C.
Inherent viscosity (0.2% NMP solution, 30° C.): 0.80 dl/g
IR spectrum: 1,640, 1,510 cm$^{-1}$ (amide), 1,240 cm$^{-1}$ (ether), 1,140 cm$^{-1}$ (sulfone), 1,070 cm$^{-1}$ (thioether), and 805 cm$^{-1}$ (aromatic ring).

EXAMPLE 24

A mixture of 3.24 g (60 mol %) of m-phenylenediamine and 8.56 g (40 mol) of 4,4'-bis(4-aminophenylthio)-benzophenone was dissolved in 100 ml of dry N-methylpyrrolidone and then placed in a 1 liter three-necked flask equipped with a stirrer, a thermometer and a dropping funnel.

A solution of 10.15 g of isophthalic acid chloride dissolved in 50 ml of dry N-methylpyrrolidone was introduced into the flask through the dropping funnel while stirring at −5° C. During this period, the reaction temperature was maintained at 0° C. or less. The mixture was stirred for 2 hours at 0° C. and then poured into acetone to precipitate a polymer.

This polymer was separated by filtration, washed with hot water, and then dried in a vacuum oven at 100° C. for 8 hours. The amount of the polymer was 18.1 g (yield: 99%). The glass transition temperature of the polymer was 244° C., and the inherent viscosity (0.2% NMP solution, 30° C.) was 0.51 dl/g. IR spectrum (as shown in FIG. 8): 1,640, 1,510 cm$^{-1}$ (amide), 1,640 cm$^{-1}$ (ketone), 1,070 cm$^{-1}$ (thioehter), and 810, 710 cm$^{-1}$ (aromatic ring).

Decomposition of the polymer did not occur in the air up to 380° C., and the polymer could be shaped into a yellow tough film by compression molding at 310° C.

The fluidity as determined under conditions of temperature 310° C. and load 100 kg using a Koka type flow tester was 2.40 cc/minute. This demonstrates that the polymer of the present invention had an excellent moldability.

EXAMPLE 25

Following the procedure of Example 20, a polymer was produced using the following ingredients.

| | |
|---|---|
| Sodium hydroxide | 8.0 g |
| Water | 150 ml |
| m-Phenylenediamine | 8.64 g |
| | (80 mol %) |
| 4,4'-Bis(4-aminophenylthio)biphenyl | 8.00 g |
| | (20 mol %) |
| Isophthalic acid chloride | 20.3 g |
| Cyclohexanone | 500 ml |

The analytical data of the polymer were as follows:
Amount of the polymer: 29.4 g (yield: 99%)
Glass transition temperature: 265° C.
Inherent viscosity (0.2% NMP solution, 30° C.)" 0.81 dl/g
IR spectrum: 1,640, 1,510 cm$^{-1}$ (amide), 1,070 cm$^{-1}$ (thioether), and 805, 710 cm$^{-1}$ (aromatic ring).

This polymer did not decompose in the air up to 385° C.

COMPARATIVE EXAMPLE 1

Following the procedure of Example 1, a polymer was produced using the following ingredients.

| | |
|---|---|
| Sodium hydroxide | 8.0 g |
| Water | 150 ml |
| m-Phenylenediamine | 10.8 g |
| Isophthalic acid chloride | 10.15 g |
| Terephthalic acid chloride | 10.15 g |
| Cyclohexanone | 500 ml |

The analytical data of the polymer were as follows:
Amount of the polymer: 23.4 g (yield: 98%)
Glass transition temperature: 288° C.
Softening point: 438° C.
Inherent viscosity (0.2% NMP solution, 30° C.): 1.44 dl/g Decomposition of the polymer in the air did not occur up to 380° C. However, its softening point was high, and the polymer could not shape into a film by compression molding. Moreover, when tested under conditions of temperature 340° C. and load 400 kg using a Koka type flow tester, the polymer did not flow at all.

EXAMPLE 26

The procedure of Example 1 was repeated using the following ingredients.

| | |
|---|---|
| Sodium hydroxide | 2.0 g |
| Water | 40 ml |
| 2,5-Dimethyl-1,4-bis(4-aminophenylthio)-benzene | 7.04 g |
| | (80 mol %) |
| 4,4'-Diamino diphenyl ether | 1.00 g |
| | (20 mol %) |
| Terephthalic acid chloride | 2.54 g |
| Isophthalic acid chloride | 2.54 g |
| Cyclohexanone | 120 ml |

The analytical data of the thus-produced polymer were as follows:
Amount of the polymer: 10.6 g (yield: 94%)
Glass transition temperature: 232° C.
Softening point: 362° C.

Inherent viscosity (0.2% NMP solution, 30° C.): 0.45 dl/g

IR spectrum: 1,640, 1,515 cm$^{-1}$ (amide), 1,240 cm$^{-1}$ (ether), 1,070 cm$^{-1}$ (thioether), and 815 cm$^{-1}$ (aromatic ring).

EXAMPLE 27

The procedure of Example 1 was repeated using the following ingredients.

| | | |
|---|---|---|
| Sodium hydroxide | 2.0 | g |
| Water | 40 | ml |
| 2,4-Bis(4-aminophenylthio)nitrobenzene | 9.23 | g |
| Isophthalic acid chloride | 5.08 | g |
| Cyclohexanone | 120 | ml |

The analytical data of the thus-produced polymer were as follows:

Amount of the polymer: 11.9 g (yield: 95%)

Inherent viscosity (0.2% DMSO solution, 30° C.): 0.09 dl/g

IR spectrum: 1,640, 1,515 cm$^{-1}$ (amide), 1,550, 1,320 cm$^{-1}$ (nitro), 1,095 cm$^{-1}$ (thioether), and 810, 715 cm$^{-1}$ (aromatic ring).

EXAMPLE 28

The procedure of Example 1 was repeated using the following ingredients.

| | | |
|---|---|---|
| Sodium hydroxide | 2.0 | g |
| Water | 40 | ml |
| 1,4-Bis[4-(4-aminophenylthio)phenyl-thio]benzene | 13.5 | g |
| Terephthalic acid chloride | 2.54 | g |
| Isophthalic acid chloride | 2.54 | g |
| Cyclohexanone | 120 | ml |

The analytical data of the thus-produced polymer were as follows:

Amount of the polymer: 16.1 g (yield: 96%)

Glass transition temperature: 120° C.

Softening point: 316° C.

Inherent viscosity (0.2% NMP solution, 30° C.): 0.11 dl/g

IR spectrum: 1,640, 1,510 cm$^{-1}$ (amide), 1,075 cm$^{-1}$ (thioether), and 815 cm$^{-1}$ (aromatic ring).

While the invention has been described in detail and with reference to specific embodiments thereof, it will be apparent to one skilled in the art that various changes and modifications can be made therein without departing from the spirit and scope thereof.

What is claimed is:

1. An aromatic polythioetheramide polymer having a repeating unit represented by the following formula:

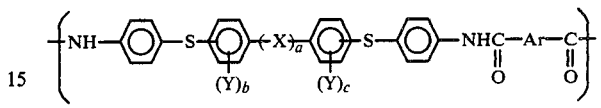

wherein X is a divalent hydrocarbon group having from 1 to 10 carbon atoms, —O—, —S—, —SO—, —SO$_2$—, or —CO—, a is 0 or 1; Y, which Y radicals are the same or different, are selected from the group consisting of an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen atom, or a nitro group, b and c, which are the same or different, each is an integer of from 0 to 4, and Ar is an aromatic ring having from 6 to 30 carbon atoms.

2. An aromatic polythioetheramide polymer having a repeating unit represented by the following formula:

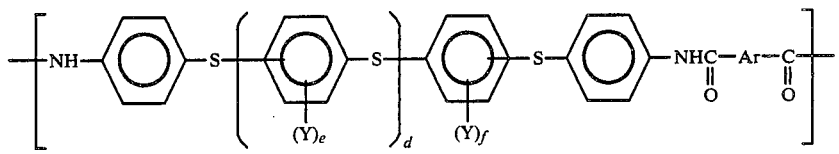

wherein d is an integer of from 0 to 20, Y is an alkyl group having from 1 to 20 carbon atoms, a cycloalkyl group having from 3 to 20 carbon atoms, an aralkyl group having from 6 to 20 carbon atoms, an aryl group having from 6 to 20 carbon atoms, a halogen atom, or a nitro group, e and f which are the same or different are each an integer of from 0 to 4, and Ar is an aromatic ring having from 6 to 30 carbon atoms.

3. An aromatic polyamide copolymer, comprising: from 51 to 99 mol % of a repeating unit represented by formula (III), and from 49 to 1 mol % of a repeating unit selected from the group consisting of repeating units of formula (IV), repeating units of formula (V) and combinations of repeating units of both of these formulas:

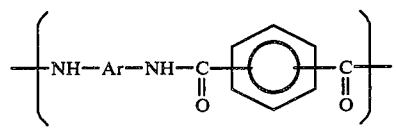
(III)

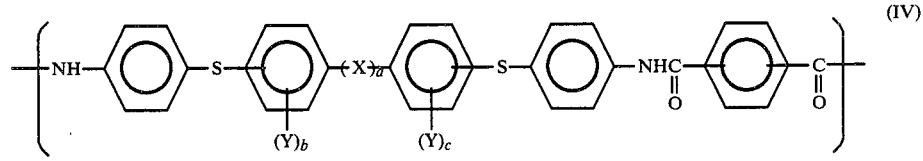
(IV)

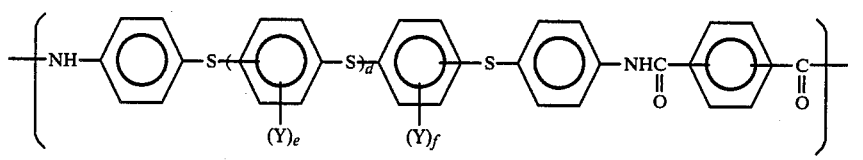

wherein Ar is an aromatic ring from 6 to 20 carbon atoms,

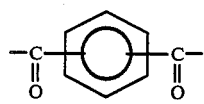

is a residue of terephthalic acid and/or isophthalic acid, X is a divalent hydrocarbon group having from 1 to 10 carbon atoms, —O—, —S—, —SO—, —SO$_2$— or —CO—, a is 0 to 1; Y, which Y radicals are the same or different, are selected from the group consisting of an alkyl group having from 1 to 20 carbon atoms, a cycloalkyl group having from 3 to 20 carbon atoms, an aryl group having from 6 to 20 carbon atoms, a halogen atom, or a nitro group, b and c, which are the same or different, each is an integer of from 0 to 4, d is an integer of from 0 to 20, and e is an integer of from 0 to 4.

4. The copolymer as claimed in claim 3, wherein Ar is

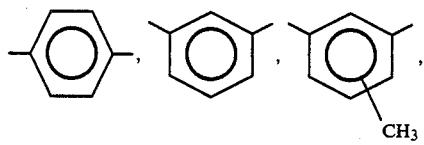

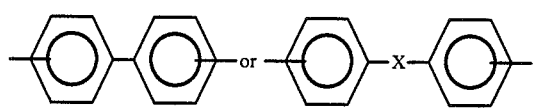

wherein X is —O—, —S—, —SO—, —SO$_2$—, —CO— or a divalent hydrocarbon group having from 1 to 10 carbon atoms.

* * * * *